United States Patent [19]

Hall et al.

[11] Patent Number: 4,856,009

[45] Date of Patent: Aug. 8, 1989

[54] METHOD AND APPARTUS FOR LASER CONTROL

[75] Inventors: John L. Hall; Miao Zhu, both of Boulder, Colo.

[73] Assignee: University Patents, Inc., Westport, Conn.

[21] Appl. No.: 59,076

[22] Filed: Jun. 8, 1987

[51] Int. Cl.$^4$ ............................................. H01S 3/13
[52] U.S. Cl. ....................................... 372/32; 372/9; 372/29
[58] Field of Search ............................ 372/29, 32, 09

[56] References Cited

U.S. PATENT DOCUMENTS 3,445,787  5/1969  Hotz ..................................... 372/32

OTHER PUBLICATIONS

"P-1—The Laser Absolute Wavelength Standard Problem", J. Hall, J. Quant. Electr. QE-4, 638, 1968; pp. 638–641.

"Precise Frequency Synthesizer Scanning of a Single Tunable Laser Using Electrooptic Modulation Techniques", M. D. Rayman et al., J. Opt. Soc. Am., Proceedings of 1985; vol. 2, No. 13, p. 18.

"A New Method for Frequency Calibration and Control of a Laser", P. Juncar, et al., Opt. Comm., vol. 14, No. 4, Aug. 1975, pp. 438–441.

"Instrument to Measure Wave Numbers of CW and Pulsed Laser Lines: The Sigmameter", P. Juncar et al., Rev. Sci. Instr., vol. 53, No. 7, Jul. 1982; pp. 939–948.

"Paraxial Ray Analysis of a Cat'-Eye Retroreflector", J. J. Snyder, Appl. Opt., Aug. 1975; vol. 14, No. 8, pp. 1825–1827.

"Pulse Swallowing Revisited", C. Alford, Fairchild Journal of Semiconductor Progress, vol. 3, pp. 10–12, Jul. 1975.

"Angstrom Measurement with Velocity of Light Compensation, Etc.", Hewlett Packard Journal, p. 18, Dec. 1971.

"Laser Wavelength Meters", J. J. Snyder, Laser Focus, pp. 55–61, May, 1982.

"A Two-Hundred-Foot Yardstick with Graduations Every Microinch", J. N. Dukes et al., Hewlett Packard Journal, Aug. 1970; pp. 2–9.

"High Precision Wavelength Meter with Fabry Perot Optics", N. Konishi et al., Appl. Phys., 25, 311–316, 1981.

"Compact High-Accuracy Wavemeter", R. Salimbeni et al., Optics Letters, Feb. 1980, vol. 5, No. 2, pp. 39–41.

"Computer Controlled CW Laser Spectrometer", C. R. Pollack et al., Applied Optics, Jun. 15, 1979/vol. 18, No. 12; pp. 1907–1912.

"Computer Controlled Fabry-Perot Wavemeter", A. Fischer et al., Optics Communications, Nov. 1, 1981; vol. 39, No. 5, pp. 272–282.

"Linear Scan Control of Tunable Lasers Using a Scanning Fabry Perot", M. J. Coulombe et al., Applied Optics, May 15, 1979; vol. 18, No. 10, pp. 1505–1512.

"Fizeau Wavemeter", J. J. Snyder, SPIE Conference on Optics, vol. 288; Apr. 1981; pp. 258–262.

(List continued on next page.)

Primary Examiner—William L. Sikes
Assistant Examiner—B. R. R. Holloway
Attorney, Agent, or Firm—Martin Novack

[57] ABSTRACT

The disclosure is directed to a method and apparatus for precisely controlling the frequency of a laser, and for precise control of distance. In a disclosed embodiment, a laser beam is split, modulated to obtain a frequency differential, and coupled to an interferometer which is designed to produce two processed beams having intensities that vary at the same ac frequency, but at a phase difference that is indicative of the laser frequency. The processed beams are converted to ac electrical signals which are coupled to phase control circuitry. The phase control circuitry determines the phase between the electrical signals and produces a control signal for controlling the laser frequency. Phase offset increments are introduced in the phase detection process, these phase offset increments resulting in controlled changes in the laser frequency. The laser frequency can be computed and read out as a function of the phase offset increments. In another embodiment, the control signal is used to accurately control a distance.

23 Claims, 4 Drawing Sheets

OTHER PUBLICATIONS

"Multiple-Wedge Wavemeter for Pulsed Lasers", L. S. Lee et al., Optics Letters, 6, 610, 1981; pp. 610-611.

"An Improved Wavemeter for CW Lasers", F. V. Kowalski et al., J. Opt. Soc. Am., 68, 1611, 1978; pp. 1611-1612.

"Consequences of Light at the Interface, etc.", R. M. Azzam, J. Opt. Soc. Am. 68, 1613, 1978, p. 1613.

"A 10-THz Scan Range Dye Laser, etc.", G. H. Williams et al., SICOLS Conference, Switzerland, 1983; pp. 1-13.

Burleigh Instruments Inc.-advertising literature; Sep. 1981; 12 sheets.

Molectron Corporation-advertising literature (2 sheets).

Lasertechnics-advertising literature (2 sheets), Nov. 1, 1982.

METHOD AND APPARTUS FOR LASER CONTROL

BACKGROUND OF THE INVENTION

This invention relates precise control of the frequency of a laser, and also has application to using a laser beam for the precise control of distance.

In the laser spectroscopy art, practitioners are always striving for improvements in sensitivity and accuracy of control over the frequency of lasers. One prior art technique employs frequency offset locking, which allows lasers to be scanned with high precision under rf phase-lock control [see J. L. Hall, J. Quant Electr., QE-4, 638 (1968)]. With this technique, accuracy is very high, being fixed by rf frequency synthesizer technology, but the scan window is narrow. Also, the technique employs an additional stabilized reference laser which serves as the reference value against which the frequency-offset scans are made, and the expense and trouble associated with the need for an additional laser detract from the simplicity and general applicability of this and other techniques that require two lasers. For this and other reasons, it has been recognized that an optical interferometer, which uses the beam from the laser to be stabilized, could be advantageously used as the frequency reference element. Since the light wavelength is so small relative to laboratory dimensions, interferometers operate ordinarily in an overtone mode. Thus, by changing the interferometric order by one or several units, one can obtain equivalent sharp resonances for laser frequency control, but now separated by many MHz, GHz, or TeraHz from the original lockpoint. At this point one has a comb of spectral reference lines, but in the act of giving up the second laser one also gives up our avenue to fine-scan control in the domain between these reference lines.

To provide the interpolation capability to augment these order-by-order precise comb steps of laser frequency, prior art systems have been developed for guiding a dye laser (or other tunable laser, for example a laser diode). One such technique is based on the use of an efficient electro-optic modulator to create an optical sideband frequency-displaced from the laser carrier by the frequency of the applied rf signal. Contemporary electro-optic materials and careful design allow bandwidths in the few GHZ range. The tunable sideband can be kept at the resonance frequency of the reference interferometer by a servo control system. In this way, changes of the rf frequency will be mapped into identical changes in the laser's carrier frequency. A system of this type then can achieve essentially rf accuracy of the scanning relative to the stable, sharp frequency reference interferometer. [See M. D. Rayman, C. G. Aminoff, and J. Hall, J. Opt. Soc. Am., Proceedings of 1985 Annual Meeting.] While this approach eliminates the need for a second tunable laser, it still requires a precision rf source which can be expensive. Furthermore, the tuning range is limited to a few GHz unless provision is made to change interference orders.

A further existing approach can be understood relative to the previously-described frequency sideband technique as follows. In the sideband technique one uses a broadband electrooptic modulator to produce an optical sideband frequency which can be scanned with precision relative to the laser carrier. The sharp Fabry-Perot resonant cavity does not need to be tuned—the interpolation between orders is provided by the scan capability of the rf modulator-produced sideband. An alternative interpolation scheme could be based on the softer, sinusoidal fringes produced by a Michelson interferometer. With this choice, the frequency control information will necessarily be less precise, but it can be arranged to have some frequency information throughout the range corresponding to one full order.

The underlying basis of one such interpolation scheme was suggested in the prior art by Juncar et al. [See P. Juncar and J. Pinard, Opt. Comm. 14, 438 (1975); and Rev. Sci. Instr. 53, 937 (1982).] This approach, called a "Sigmameter", makes use of the fact that an interferometer produces a map between optical frequency changes and the change in phase of the associated interference pattern. With optical phase delay techniques (total internal Fresnel reflection) the Sigmameter obtains two photosignals representing sine and cosine phase quadratures of the interference signal. The Sigmameter obtains phase, and uses it to control the optical frequency. However, the technique has not been widely applied because the information about the interference phase (and hence about the optical frequency) is only available as a dc signal, and therefore risks contamination by dc problems such as changing fringe visibility, stray light, and dc drift.

It is among the objects of the present invention to improve upon prior art techniques of the type set forth, and to generally improve the art of controlling laser frequency and controlling distance.

SUMMARY OF THE INVENTION

The present invention is directed to a method and apparatus for precisely controlling the frequency of a laser. The invention is also directed to a novel interferometric technique and system, and to precise control of distance.

In accordance with a form of the method of the invention, there is provided a technique for controlling the frequency of a laser. The laser beam is processed, using an interferometric system to be described, to obtain first and second processed beams having periodic time-varying intensities at the same frequency, the second beam having a phase difference from the first beam that is a function of the laser frequency. A first electrical signal is generated from the first processed beam and second electrical signal is generated from the second processed beam. The phase of the second electrical signal with respect to the first electrical signal is detected, and a control signal is produced as a function of the detected phase. The control signal is used to control the laser frequency.

In the preferred embodiment of the method, phase offset increments are introduced in the phase detection process, so as to vary the frequency of the laser. The phase offset increments are a small fraction of one 360 degree phase circle of the frequency of said first and second electrical signals. The laser frequency is determined as a function of the phase offset increments. Also, in the preferred embodiment the step of detecting phase difference includes: establishing a reference phase-locked loop having a phase that is dependent on one of the electrical signals, and phase detecting the other of the electrical signals against signals derived in the phase locked loop.

In a form of the invention, the first and second processed beams are generated as follows: the laser beam is split into first and second beam portions, and a frequency differential is introduced as between the beam portions. Each of the beam portions is divided into first and second parts. A first part of one beam portion is combined with a first part of the other beam portion, and the second part of said one beam portion is combined with the second part of said other beam portion; the combinations being performed after the first and second parts of one of the beam portions have traversed optical distances of substantially different lengths.

The frequency scan available with the technique of the present invention is substantially linear over a very wide frequency interval, as the interpolation hereof applies between adjacent interferometric periods that can be accurately determined over a broad spectrum.

In the present invention, any errors associated with the introduced phase offset increments, or "steps", are non-accumulating; i.e., once a full 360 degree phase circle of increments has been implemented, a full interferometer period (750 MHz, in the example to be set forth) is traversed, and the interpolation will begin anew. Also, errors associated with the substeps hereof, which are used to interpolate between the steps, are non-accumulating.

In accordance with a further form of the invention, there is disclosed a technique for controlling a distance using a laser. The laser beam is processed, to obtain first and second processed beams having periodic time-varying intensities at the same frequency, the second beam having a phase difference from the first beam that is a function of the distance to be controlled. A first electrical signal is generated from the first processed beam and the second electrical signal is generated from the second processed electrical signal is generated from the second processed beam. The phase of the second electrical signal with respect to the first electrical signal is detected, and a control signal is produced as a function of the detected phase. In this case, the control signal is used to control distance. A predetermined phase offset is introduced in the phase detection process to vary the distance being controlled.

Further features and advantages of the invention will become more readily apparent from the following detailed description when taken in conjunction with the accompanying drawings.

DESCRIPTION OF THE PREFERRED EMBODIMENT

Figure 1:
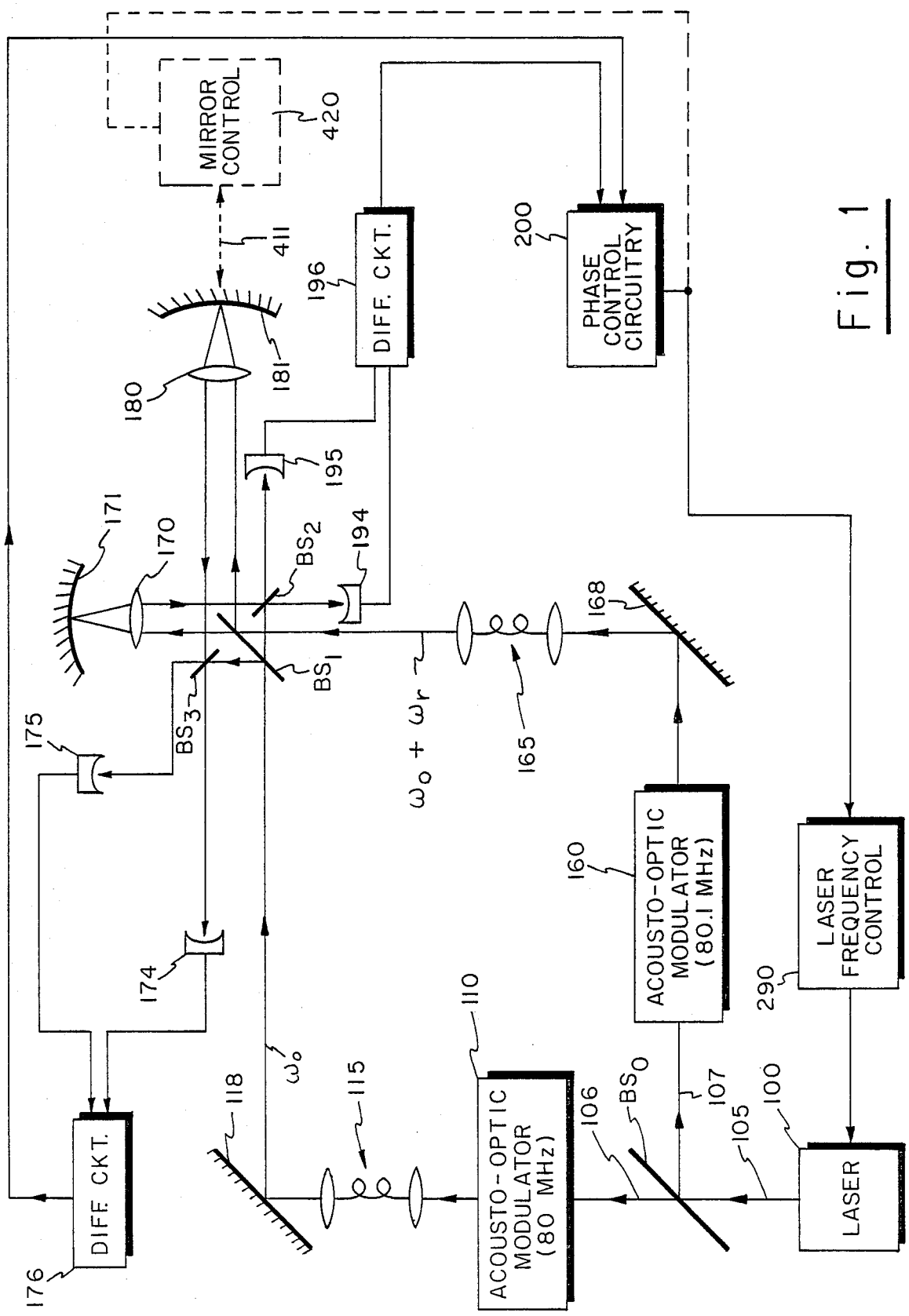
FIG. 1 is a schematic diagram, partially in block form, of an embodiment of an apparatus in accordance with the invention, and which can be used to practice the method of the invention.

Referring to FIG. 1, there is shown a schematic diagram, partially in block form, of an embodiment of an apparatus in accordance with the invention, and which can be used to practice an embodiment of the method of the invention. A laser 100; whose frequency is to be controlled, produces a laser beam 105 that is split by a beam splitter, BS$_0$, into two portions, designated as beams 106 and 107. [As used herein, the term laser is intended in a generic sense, covering a wide scope of coherent radiation sources.] Each of the beams 106 and 107 is subjected to a single-sideband frequency shift, with obtainment of a 100 KHz frequency difference (for this example) as between the two beams. This is implemented by utilizing respective acousto-optic modulators 110 and 160, operating in the Bragg regime, and having modulation frequencies separated by 100 KHz. In the present example, frequencies of 80.0 MHz and 80.1 MHz are utilized. After experiencing the frequency shifts of 80.0 and 80.1 MHz, respectively, the two beams are passed through polarization-holding optical fibers, 115 and 165, respectively. As is known in the art, by virtue of this optical fiber processing, which is symbolically represented in the Figure by a pair of lenses having a fiber therebetween (for each of the units 115 and 165), geometrical changes in the source region will not be passed on to the subsequent portions of the optical system. In the configuration of FIG. 1, a stationary mirror 168 is shown as being interposed between the acousto-optic modulator 160 and the optical fiber unit 165, and a fixed mirror 118 reflects the beam received from optical fiber unit 115. In this manner, the two beams enter the interferometer configuration of the present embodiment at right angles.

In the present embodiment, a dual Michelson interferometer setup is utilized which employs beam splitters designated as BS$_1$, BS$_2$ and BS$_3$, lens systems designated by lenses 170 and 180, and Michelson mirrors designated 171 and 181. The beam portion that was subjected to the 80 MHz frequency shift, which is at a frequency designated $\omega_o$, is split by beam splitter BS$_1$ into two parts which are respectively directed to the beam splitters BS$_2$ and BS$_3$. [In actuality, the sideband that is used, and is designated by angular frequency $\omega_o$, is 80 MHz above or 80 MHz below the laser frequency—depending upon which sideband is used. However, for ease of explanation, $\omega_o$ will be considered as the frequency of laser 100. It will be recognized that each time $\omega_o$ is referred to, an adjustment of a constant 80 MHz (80 MHz times $2\pi$, in angular frequency form) is understood, and can be accounted for in any calibration as may be necessary. Also, when an "$\omega$" notation is used, it will be understood that angular frequency is intended. ] The beam portion that was subjected to the 80.1 MHz frequency shift, and which is at a frequency designated $\omega_o+\omega_r$, is split, by another part of beamsplitter BS$_1$, into two parts. One of the ($\omega_o+\omega_r$) parts is passed to lens system 170 and Michelson mirror 171, and is received by beam splitter BS$_2$, where it is combined with a ($\omega_o$) part of the beam. The other ($\omega_o+\omega_r$) part is directed to lens system 180 and Michelson mirror 181, and is received by beam splitter BS$_3$, where it is combined with the other ($\omega_o$) part of the beam.

The respective combined-beam outputs of beam splitter BS$_2$ are complementary, and can be respectively represented as being of the form:

$$1+\cos(\omega_r t+\phi_o), \text{ and} \tag{1}$$

$$1-\cos(\omega_r t+\phi_o) \tag{2}$$

where $\omega_r$ is 100 KHz in the present example, and where $\phi_o$ is the constant phase reference angle of the time-varying (sinusoidal, in the case) signal. The outputs of beam splitter BS$_2$ are respectively received by photodetectors 194 and 195, the outputs of these photodetectors being coupled to respective inputs of a difference circuit 196. The output of difference circuit 196, which is sometimes hereinafter referred to as the "reference" output, can be represented as $$\text{ref. output} \sim \cos(\omega_r t + \phi_o) \quad (3)$$

The respective outputs of beams splitter BS$_3$ are also available in complementary form, and can be represented as:

$$1 + \cos(\omega_r t + \phi_o + \phi) \quad (4)$$

$$1 - \cos(\omega_r t + \phi_o + \phi) \quad (5)$$

where $\phi$ is the phase difference with respect to the beam portions at BS$_2$. $\phi$ can be expressed as:

$$\phi = \Delta l \cdot \omega_o / c \quad (6)$$

where $\omega_o$ is the laser frequency, $\Delta l$ is the difference in path length of the two beam parts, and c is the velocity of light. These outputs are received by respective photodetectors 174 and 175, the outputs of which are coupled to respective inputs of a difference circuit 176. The output of difference circuit 176, which is sometimes hereinafter referred to as the "signal" output, can be represented as $$\text{signal output} \sim \cos(\omega_r t + \phi_o + \phi) \quad (7)$$

In the example of present embodiment, the path length difference, $\Delta l$, of the $(\omega_o + \omega_r)$ beam, as compared to the $\omega_r$ beam, is 20 cm, so it follows from equation (6) that 360 degrees of the phase $\phi$ corresponds to 750 MHz. The interferometer layout was chosen so that equal amounts of beam-splitter substrate appear in the "reference" and "signal" paths. This provision, along with preparing all three beam splitter/combiners from a single coated substrate, insures a minimum chromatic or temperature sensitivity. The Michelson mirrors can be realized as catseye reflectors, with reflective design and with Al coatings to minimize wavelength-dependent phaseshifts on reflection. A feature of the catseye reflector involves the use of a curved mirror in the focal plane. In this way, one can produce an effective geometric transformation of the wavefronts to recreate and thus "modematch" the reference beam wavefront distribution on the beam recombining mirror. This procedure is helpful in avoiding any interference phaseshift of geometric origin. [See J. J. Snyder, Appl. Opt. 14, 1825 (1975).] Equivalent optical design could be advantageously realized with an all reflective type of catseye retroreflector to facilitate operation over a very broad spectral band.

Figure 2:
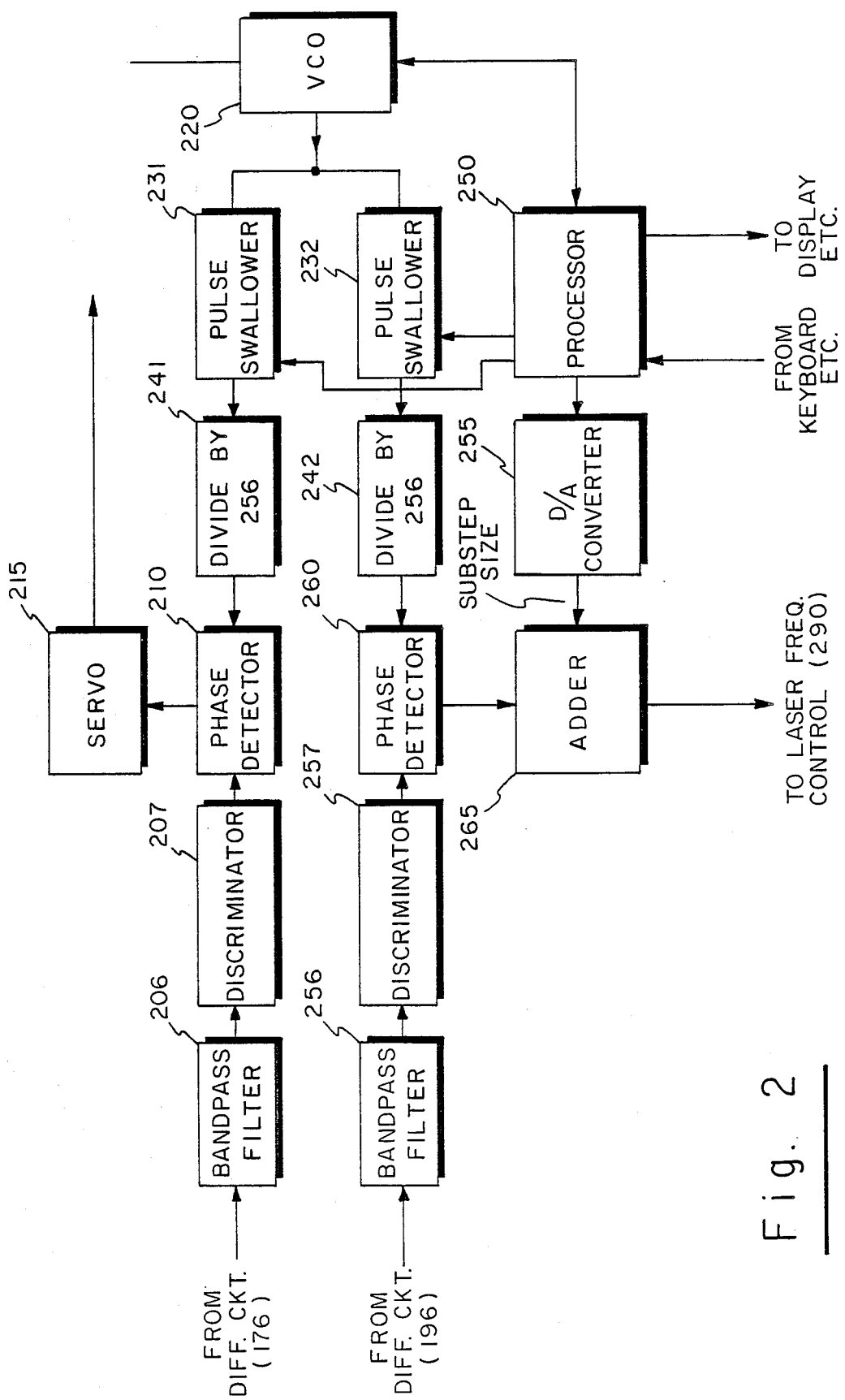
FIG. 2 is a block diagram of an embodiment of the phase control circuitry and technique in accordance with the invention.

The outputs of difference circuits 176 and 196 are coupled to phase control circuitry 200, which is described in further detail in conjunction with FIG. 2. The phase control circuitry, in turn, controls a laser frequency control subsystem 290 that is associated with the laser 100. The subsystem 290 may be of a type known in the art, for example the type wherein a piezoelectric transducer is controlled to displace a mirror which thereby varies the length of the laser cavity.

Referring to FIG. 2, there is shown a block diagram of the reference phase control circuitry 200 of the FIG. 1 embodiment. The reference signal from difference circuit 176 is coupled, via a bandpass filter 206 and a discriminator 207, to one input of a phase detector 210. The phase-shifted signal (from difference circuit 196) is coupled, via bandpass filter 256 and discriminator 257, to one input of another phase detector 260. The output of phase detector 210 is coupled to servo amplifier 215 whose output is, in turn, coupled to the control input of a voltage-controlled oscillator 220. The output of voltage-controlled oscillator 220 is coupled to respective "pulse-swallower" circuits 231 and 232. The outputs of the pulse-swallower circuits are coupled to respective divide-by-256 circuits 241 and 242, whose outputs are the respective second inputs to phase detectors 210 and 260. The output of phase detector 260 is coupled to an adder circuit 265, whose output is, in turn, coupled to the laser frequency control subsystem 290 (FIG. 1). A processor 250, which may comprise, for example, any suitable microprocessor or computer, with associated memory, input/output ports, etc. (not shown), produces control signals which control the pulse swallower circuits 231 and 232. An output of processor 250 is also coupled, via a digital-to-analog converter 255, to the adder circuit 265.

In operation, the ac signal in the reference channel (input to phase detector 210) is used to phaselock the voltage-controlled oscillator 220, so that its output frequency (which is centered at 25.6 MHz in the present embodiment), after digital division by 256, is in phase with the received ac reference signal. Recalling that the information rate of the ac signal is 100 KHz (i.e., the outputs at frequency $\omega_r/2\pi$ resulting from the frequency difference between the modulators 160 and 110), 256 digital steps per cycle are obtained by having an oscillator running at 256 times the 100 KHz frequency; i.e., at 25.6 MHz. The pulses output from the voltage-controlled oscillator are passed (via the pulse swallower 231, to be described) through circuit 241, which can be implemented as a counter that effectively provides digital division by 256. Thus, 256 pulses must be received by circuit 241 before it issues an output pulse. The phase of this output pulse, as compared to the phase of the input reference signal, determines the output of phase detector 210. This phase detector provides servo information to control the phase change produced by the voltage-controlled oscillator 220.

The "signal" input (containing the phase information $\phi$, which depends upon $\omega_o$ and $\Delta l$) is also at a frequency of 100 kHZ in the illustrated embodiment. This signal is compared (by phase detector 260) to the output of voltage-controlled oscillator 220, which is again (after passing through pulse swallower 232) digitally divided by 256. The result, which is output from phase detector 260, is a function of $\phi$, and it is coupled, via adder 265, to laser frequency control subsystem 290. The laser frequency, $\omega_o$, will therefore be adjusted in accordance with the detected phase.

By changing the phase relationship between the two count-to-256 scalar states, the relationship between the signal and reference phases can be advanced or retarded in a controlled way, there being 256 "steps" in a full $2\pi$ phase excursion. This precisely controlled phase change results in a precise change in the laser frequency, as the phase difference output from phase detector 260 is used to control the laser frequency, so the interferometric lockpoint will be changed. When a pulse is "swallowed" (i.e., one pulse is removed from the sequence of pulses received from the voltage-controlled oscillator 220) by circuit 231 in the reference channel, the relative phase is advanced one step, and the laser frequency shifts toward the red. Conversely, when a pulse is "swallowed" by circuit 232 in the signal channel, the relative phase is retarded one step, and the laser frequency shifts toward the red. [Pulse swallowing circuits are known in the art, and reference can be made, for example, to an article entitled "Pulse Swallowing Revisited", C. Alford, Fairchild Journal of Semiconductor Progress, Vol. 3, pp. 10–12, 1975.]

In the present example, each $2\pi$ of phase is divided into 256 steps, so each step represents 750 MHz divided by 256, which equals 2.93 MHz. To obtain still higher resolution, the present embodiment uses a technique of dividing each step into a series of "substeps", by matching the phase detector analog voltage against ten digital steps. This is implemented in the FIG. 2 embodiment with the digital-to-analog converter 255 and the adder 265. When the processor 250 (using the routine described hereinbelow) issues a command to (say) add a substep, the analog signal received by adder 265 will cause the output of adder 265 to increase by 1/10 of the magnitude that would be attributable to the phase detector output for one step. Accordingly, each substep represents a laser frequency shift of 2.93 MHz divided by 10, which equals 293 KHz.

Figure 3A:
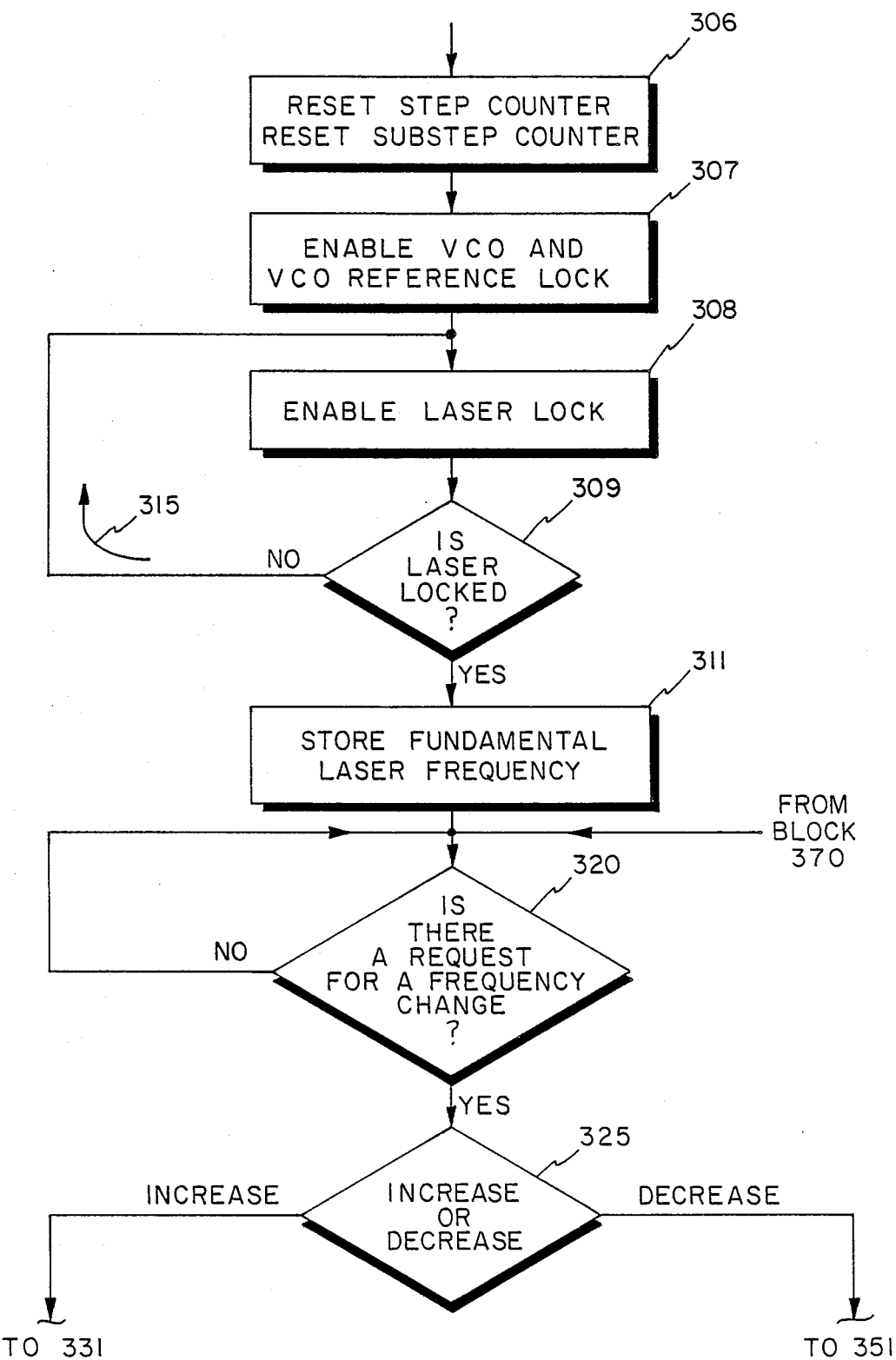
FIG. 3, which includes FIGS. 3A and 3B placed one below another, is a flow diagram of a routine for programming the processor of the FIG. 2 embodiment.
Figure 3B:
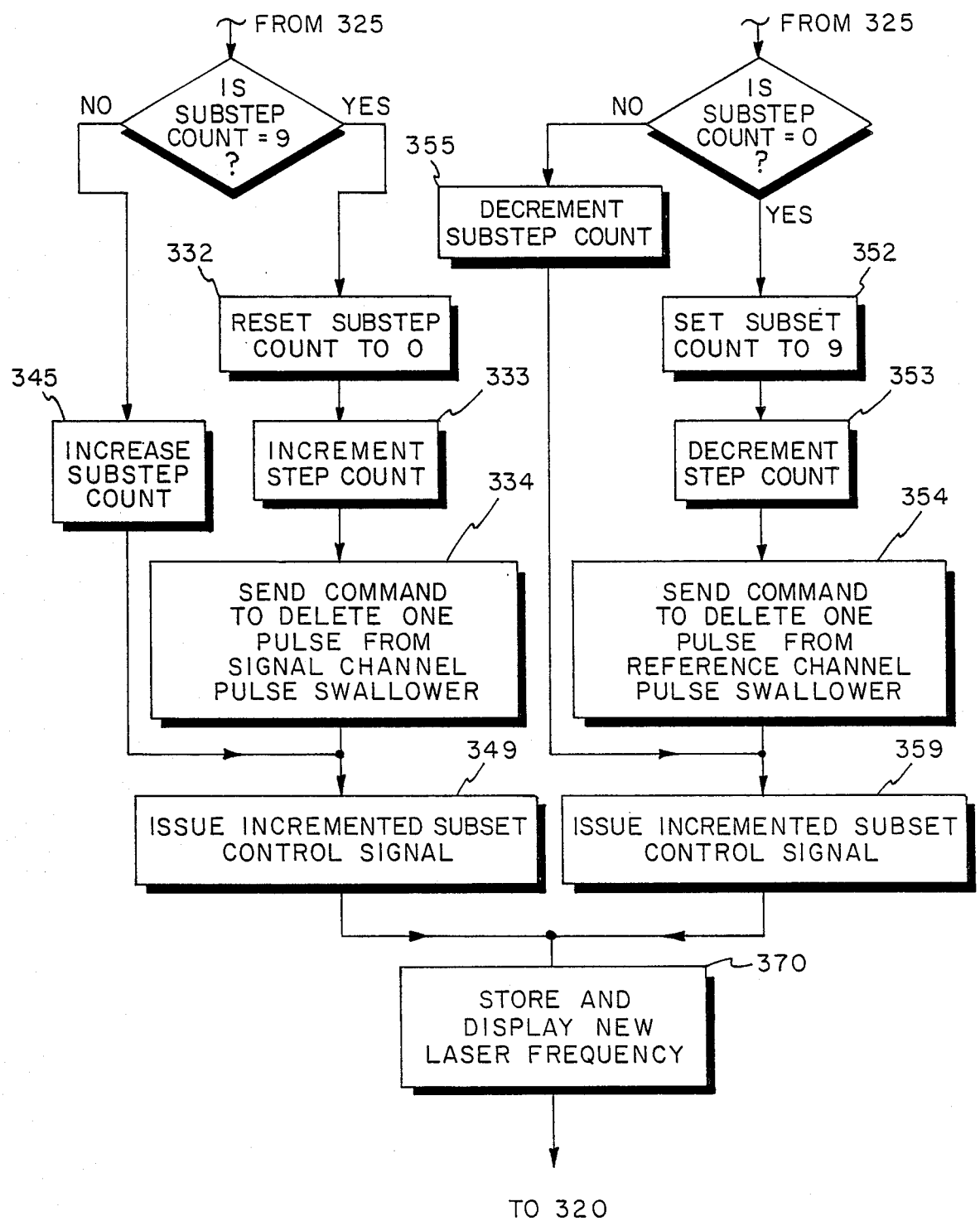

Referring to FIG. 3, there is shown a flow diagram of the routine for programming the processor 250 in accordance with an embodiment of the invention. At the beginning of the routine, a step counter, which keeps track of the pulses removed by swallowers 231 and 232, and a substep counter, which keeps track of the substep level being sent to the adder 265, are reset, this function being represented by the block 306. The block 307 is then entered, this block representing the enabling of the voltage-controlled oscillator 220 and the enabling of the procedure for obtaining reference lock of the voltage-controlled oscillator. The block 308 is then entered, this block representing the enabling of laser lock. In this procedure, outputs of the phase detector 260 operate to control the laser frequency control system 290, which, in turn, controls the laser frequency to become stabilized at one of the comb of frequencies (750 MHz apart in the present embodiment) associated with the present laser cavity length. This laser frequency is readily ascertainable by means well known in the art, and can be stored and used as a reference value from which the processor keeps track of subsequently controlled frequency changes. Inquiry is made as to whether or not the laser is locked, as represented by decision diamond 309. This can be achieved, for example, by having the processor monitor the status of the output of phase detector 260, or by any other suitable means. If lock is not yet achieved, the lock procedure is continued, and the loop 315 continues until lock is achieved. The block 311 represents the storage of the fundamental laser frequency.

Decision diamond 320 is next entered, and represents the determination as to whether or not there is a request for a laser frequency change. Such request would typically be from operator control or a predetermined routine for obtaining a particular desired laser frequency. [Further, as noted below, this may also result from a desire to modify the distance $\Delta l$, when the system is being utilized to precisely control or measure a distance.] If there is no existing request for a frequency change, diamond 309 is reentered. If such a request exists, it is determined whether it is a request for increase or decrease of the laser frequency, as represented by decision diamond 325.

If an increase in frequency is to be implemented, determination is made if the substep count is 9, as represented by the diamond 331. If not, the substep count is increased, as represented by block 345, and the 349 is entered. The block 359 represents the issuance of the new substep control signal (as issued by processor 250 to the adder 265 via digital-to-analog converter 255), in accordance with the new substep count. If the substep count is 9, the block 332 is entered, this block representing the resetting of the substep count to 0. This means that the step count should be incremented, this function being represented by the block 333. A command is then sent (block 334) to control the pulse swallower 232 of the "signal channel" to swallow a pulse, and the block 349 is entered. Next, the block 370 is then entered, this block representing the storage and display of the new laser frequency resulting from the change just implemented. In particular, the new laser frequency can be expressed as $$f_{new} = f_o + (F + S/10)\cdot\delta, \qquad (8)$$

where $f_o$ is the fundamental baseline frequency, F is the step count (which can be positive or negative), S is the substep count, and $\delta$ is the change in frequency associated with one step, namely 2.93 MHz in the present example.

In the case where the laser frequency is to be decreased, a determination is made (diamond 351) as to whether or not the substep count is at zero. If not, the substep count is decremented (block 355), and the block 359 is entered, this block representing the issuance of the new substep control signal level. In the case where the substep count is zero, the block 352 is entered, this block representing the setting of the substep count to 9. The step count is then decremented (block 353), and a command is sent (block 354) to the pulse swallower 231 of the "reference channel" to swallow one pulse. The block 359 is then entered, followed by entrance to block 370. The diamond 320 is then reentered, and the next request for a frequency change is awaited.

When a complete $2\pi$ circle (i.e., 750 MHz of frequency shift, in either direction) has been traversed, the interpolation will begin anew. In this manner, errors during one phase circle traversal will not accumulate.

In the previous description, it was assumed that $\Delta l$ in relationship (6) is fixed. However, $\Delta l$ in the interferometer can be changed, and the disclosed system and technique can be utilized to control $\Delta l$. In FIG. 1, the dashed arrow 411 represents the mirror 181 as being adjustable, under control of mirror position controller 420 (also shown in dashed line), which may be of a known type, for example a piezoelectric controller. The mirror can be controlled by an output of the phase control circuitry, as is also shown in dashed line. In this case, the output of phase detector 260 (or adder 265, if substeps are used) will tend to adjust the interferometric path difference, $\Delta l$, to remove the phase error.

The invention has been described with reference to a particular preferred embodiment, but variations within the spirit and scope of the invention will occur to those skilled in the art. For example, it will be understood that other circuit configurations could be utilized to implement the functions of the FIG. 2 circuitry. If desired, a second phase-locked loop could be used in the signal channel.

We claim:
1. A method for controlling the frequency of a laser, comprising the steps of:
generating, from the beam of the laser, first and second processed beams having periodic time-varying intensities at the same frequency as each other and below the laser frequency, said second beam intensity having a phase difference from the first beam intensity that is a function of the laser frequency;

generating a first electrical signal as a function of said first beam intensity and a second electrical signal as a function of said second beam intensity;

detecting the phase difference between the first and second electrical signals, and producing a control signal as a function of the detected phase difference; and controlling the laser frequency with the control signal.

2. The method as defined by claim 1, further comprising the step of introducing a predetermined phase offset in said detecting of phase difference, so as to vary the frequency of the laser.

3. The method as defined by claim 1, further comprising the steps of introducing phase offset increments in said detecting of phase difference, and determining the laser frequency as a function of the phase offset increments.

4. The method as defined by claim 3, wherein said step of detecting phase difference includes: establishing a reference phase-locked loop having a phase that is dependent on one of said electrical signals; and phase detecting the other of said electrical signals against the signals derived from said phase locked loop.

5. The method as defined by claim 3, wherein said phase offset increments are a small fraction of one 360 degree phase circle of the frequency of said first and second electrical signals.

6. The method as defined by claim 4, wherein said phase offset increments are a small fraction of one 360 degree phase circle of the frequency of said first and second electrical signals.

7. The method as defined by claim 3, further comprising the step of generating a further control signal component as a fraction of the magnitude of the control signal associated with a phase offset increment in the phase detection process; combining the further control signal component with the control signal; and determining the laser frequency as a function of the phase offset increments and the fraction of a phase offset increment associated with said further control signal component.

8. The method as defined by claim 6, further comprising the step of generating a further control signal component as a fraction of the magnitude of the control signal associated with a phase offset increment in the phase detection process; combining the further control signal component with the control signal; and determining the laser frequency as a function of the phase offset increments and the fraction of a phase offset increment associated with said further control signal component.

9. The method as defined by claim 1, wherein said step of generating said first and second processed beams comprises:

splitting said laser beam into first and second beam portions;

introducing a frequency differential as between said beam portions;

dividing each of said beam portions into first and second parts;

combining the first part of one of said first and second beam portions with the first part of the other of said first and second beam portions, and combining the second part of said one beam portion with the second part of said other beam portion, said combinings being performed after the first and second parts of either of the beam portions have traversed optical distances of substantially different lengths;

said processed beams comprising said combined beams.

10. The method as defined by claim 3, wherein said step of generating said first and second processed beams comprises:

splitting said laser beam into first and second beam portions;

introducing a frequency differential as between said beam portions;

dividing each of said beam portions into first and second parts;

combining the first part of one of said first and second beam portions with the first part of the other of said first and second beam portions, and combining the second part of said one beam portion with the second part of said other beam portion, said combinings being performed after the first and second parts of either of the beam portions have traversed optical distances of substantially different lengths;

said processed beams comprising said combined beams.

11. The method as defined by claim 10, wherein each said step of combining respective parts of the respective beam portions produces two complementary processed beams.

12. The method as defined by claim 11, wherein said first electrical signal is obtained from one of the pairs of complementary beams and said second electrical signal is obtained from the other of the pairs of complementary beams.

13. An interferometry method, comprising the steps of:

splitting a laser beam into first and second beam portions;

introducing a frequency differential as between said beam portions;

dividing each of said beam portions into first and second parts;

combining the first part of one of said first and second beam portions with the first part of the other of said first and second beam portions, and combining the second part of said one beam portion with the second part of said other beam portion, said combinings being performed after the first and second parts of either of the beam portions have traversed optical distances of substantially different lengths; and generating electrical signals from the respective combined beams, said electrical signals being ac signals at the same frequency and having a phase difference that is a function of the laser frequency and of the difference between said optical distances of substantially different lengths.

14. The method as defined by claim 13, wherein each said step of combining respective parts of the respective beam portions produces two complementary beams.

15. The method as defined by claim 14, wherein one electrical signal is obtained from one of the pairs of complementary beams and other electrical signal is obtained from the other of the pairs of complementary beams.

16. A method for controlling a distance using a laser, comprising the steps of:

generating, from the beam of the laser, first and second processed beams having periodic time-varying intensities at the same frequency as each other and below the laser frequency, said second beam intensity having a phase difference from the first beam intensity that is a function of the distance to be controlled;

generating a first electrical signal as a function of said first beam intensity and a second electrical signal as a function of said second beam intensity;

detecting the phase difference between the first and second electrical signals, and producing a control signal as a function of the detected phase difference;

controlling said distance with the control signal; and introducing a predetermined phase offset in said detecting of phase difference, so as to vary the distance being controlled.

17. The method as defined by claim 16, further comprising the steps of introducing phase offset increments in said detecting of phase difference, and determining said distance as a function of the phase offset increments.

18. Apparatus for controlling the frequency of a laser, comprising:

a laser for generating a laser beam;

means for processing the laser beam to obtain first and second processed beams having periodic time-varying intensities at the same frequency as each other and below the laser frequency, said second beam intensity having a phase difference from the first beam intensity that is a function of the laser frequency;

means for generating a first electrical signal as a function of said first beam intensity and a second electrical signal as a function of said second beam intensity;

means for detecting the phase difference between the first and second electrical signals, and for producing a control signal as a function of the detected phase difference; and means for controlling the laser frequency with the control signal.

19. Apparatus as defined by claim 18, further comprising means for introducing a predetermined phase offset in said detecting of phase difference, so as to vary the frequency of the laser.

20. Apparatus as defined by claim 18, further comprising means for introducing phase offset increments in said detecting of phase difference, and means for determining the laser frequency as a function of the phase offset increments.

21. Apparatus as defined by claim 20, wherein said means for detecting phase difference includes: a reference phase-locked loop having a phase that is dependent on one of said electrical signals; and means for phase detecting the other of said electrical signals against the signals derived from said phase locked loop.

22. Apparatus as defined by claim 21, wherein said phase-locked loop includes: a voltage-controlled oscillator operating at a frequency that is a multiple of the frequency of said first and second electrical signals, a first pulse swallower circuit for receiving the output of said voltage-controlled oscillator, a first divider circuit for receiving the output of said first phase swallower circuit, and a first phase detector for comparing the phase of the first electrical signal with the phase of the output of the first divider circuit, and wherein said means for detecting phase difference includes a second pulse swallower for receiving the output of the voltage-controlled oscillator, a second divider circuit for receiving the output of said second pulse swallower circuit, and a second phase detector for comparing the phase of the second electrical signal to the phase of the output of the second divider circuit, said control signal being obtained from the output of said second phase detector.

23. Apparatus as defined by claim 22, wherein said means for introducing phase offset increments comprises means for controlling said first and second pulse swallower circuits.

* * * * *